US007144327B2

(12) United States Patent
Coenen et al.

(10) Patent No.: US 7,144,327 B2
(45) Date of Patent: Dec. 5, 2006

(54) PROTECTION ARRANGEMENT

(75) Inventors: Herbert Coenen, Königswinter (DE); Paul Herchenbach, Ruppichteroth (DE); Markus Stommel, Siegburg (DE)

(73) Assignee: GKN Walterscheid GmbH (DE)

( * ) Notice: Subject to any disclaimer, the term of this patent is extended or adjusted under 35 U.S.C. 154(b) by 55 days.

(21) Appl. No.: 10/981,849

(22) Filed: Nov. 5, 2004

(65) Prior Publication Data

US 2005/0124424 A1 Jun. 9, 2005

(30) Foreign Application Priority Data

Nov. 5, 2003 (DE) ................................ 103 52 162

(51) Int. Cl.
*F16D 3/84* (2006.01)

(52) U.S. Cl. ........................ 464/173; 464/17; 464/175; 56/DIG. 24

(58) Field of Classification Search ........ 464/171–173, 464/175, 17; 56/DIG. 24
See application file for complete search history.

(56) References Cited

U.S. PATENT DOCUMENTS

| | | | | |
|---|---|---|---|---|
| 4,435,166 | A * | 3/1984 | Bondioli | 464/172 |
| 4,501,573 | A | 2/1985 | Bondioli | |
| 5,971,858 | A * | 10/1999 | Aurora | 464/172 |
| 6,966,838 | B1 * | 11/2005 | Herchenbach et al. | 464/17 |
| 2003/0109316 | A1 | 6/2003 | Herchenbach et al. | |

FOREIGN PATENT DOCUMENTS

| | | |
|---|---|---|
| DE | 32 23 864 | 2/1983 |
| DE | 88 07 327.0 | 7/1988 |
| DE | 101 53 822 C1 | 4/2003 |
| EP | 0 802 342 | 10/1997 |
| WO | WO 01/16501 | 3/2001 |

* cited by examiner

*Primary Examiner*—Aaron Dunwoody
(74) *Attorney, Agent, or Firm*—Harness, Dickey & Pierce, P.L.C.

(57) ABSTRACT

A protection arrangement for a double universal joint (1) for drives of agricultural implements has a first protection element (11), an annular second protection element (15) and a third protection element (18). The first protection element (11) has first holding projections (14) circumferentially distributed on its outer circumference (13) close to the first front edge. The first holding projections (14) project beyond the outer circumference (13) and form at least over a circumferential edge portion, distanced to the first front edge, a groove. A support tab projects beyond the first front edge. The second protection element (15) has second holding projections (17) circumferentially distributed on its outer circumference close to the second front edge. The second holding projections (17) project beyond the outer circumference and form, at least over a first circumferential edge area close to the second front edge, a second groove. An undercut portion is formed over a second circumferential edge area distanced to the second front edge. The third protection element (18) has holding portions at both ends. The holding portions include a number of first through holes (20) or second through holes, respectively. The through holes engage the holding projections (14, 17), corresponding in number to the first holding projections (14) and second holding projections (17).

10 Claims, 3 Drawing Sheets

9
8
7
23a
24
18
12
13
6
5
1
11
4
10
3
2
17
20;14
19

26
14
30
25
13
11
(12)

18
23
20
19
24
31
20
33
32

14
11
12
25
13
27
28
30
L
III
III
29
22
28

PROTECTION ARRANGEMENT

CROSS-REFERENCE TO RELATED APPLICATIONS

This application claims priority to German Patent Application No. 10352162.3, filed Nov. 5, 2003, which application is herein expressly incorporated by reference.

FIELD OF THE INVENTION

The invention relates to a protection arrangement for a joint, especially a double universal joint, for driving or drives of agricultural devices and self-propelled implements. The protection arrangements serve to protect against accidental contact and are stationarily held by a connection member. Thus, the joint, enclosed by the protection arrangement, can rotate. The protection arrangement does not rotate and serves to prevent contact with rotating components.

BACKGROUND OF THE INVENTION

Such a protection arrangement is described in DE 101 53 822 C1 (US2003/0109316 A1). This protection arrangement includes a first protection element with an annular portion. The annular portion has a first front edge and on its outer circumference a first attachment mechanism, in the form of a collar. An annular second protection element is provided in the form of a connection element. A third protection element is arranged between the first protection element and the second protection element. The third protection element is made from an elastomer material and has, on a first annular end, a hook-like first connection mechanism to connect with the first attachment mechanism. The third protection element, on a second annular end, includes a second connection mechanism to connect to the second attachment mechanism on the connection element. The connection element has a seat face as a second attachment mechanism. A collar of the third protection element, which is slotted and can be reduced in diameter by screws, can be retained as a second connection mechanism. The third protection element is formed with a fold in the area between the first annular end and the second annular end. The first attachment end is formed with a diameter different from the second attachment end. The fold extends in a radial section containing the longitudinal axis. Depending on the articulation of the joint, the fold extends in a part of the circumference and in a further part of the circumference the fold compresses. Through holes are provided in the envelope portion between the first annular portion and the second annular portion of the third protection element. The envelope portion can also have a lattice structure and forms at least one fold. When articulating the joint, large forces act on the attachment mechanism or connection, respectively, because of the lengthening and the compression.

SUMMARY OF THE INVENTION

It is an object of the invention to form the connection of the third protection element to the first or second protection element, respectively, in order to achieve a secure retainment.

A protection arrangement for a joint, especially a double universal joint for driving or drives of agricultural devices and self-propelled implements, comprises a first protection element with an annular portion with a first front edge. The first protection element is provided with a first attachment mechanism on its outer circumference. An annular second protection element has a second attachment mechanism on its outer circumference and a second front edge. A third protection element is made from an elastomer material. The third protection element has a first connection mechanism on a first annular end to connect to the first attachment mechanism. A second annular end of the third protection element has a second connection mechanism to connect to the second attachment mechanism. A circumferentially extending envelope portion, forming at least one fold, is positioned between the first and second annular ends. The first attachment mechanism of the first protection element is formed by first holding projections. The first holding projections are circumferentially distributed on the outer circumference of the first protection element and close to the first front edge. The first holding projections project beyond the outer circumference. A groove is formed at least over a circumferential portion distanced from the first front edge. An undercut circumferential edge portion or a support tab are formed over a circumferential portion close to the first front edge. The undercut edge projects beyond the first front edge. The second attachment mechanism of the second protection element is formed by second holding projections. The second holding projections are circumferentially distributed on the outer circumference of the second protection element close to the second front edge. The second holding projections project beyond the outer circumference. A second groove is formed at least over a first circumferential edge area close to the second front edge. An undercut portion or a groove is formed over a second circumferential edge area distanced to the second front edge. The first connection mechanism and the second connection mechanism include holding portions formed on the third protection element at its ends. The holding portions have a number of first through holes and second through holes corresponding to the number of first holding projections and second holding projections. The first through holes and second through holes engage the holding projections and boundary edge portions which engage, respectively, at least the corresponding groove.

An advantage of this embodiment is that a secured retainment is achieved between the third protection element and the first protection element and between the third protection element and the second protection element. Also, the securement ensures that a detaching is only possible by using tools, to avoid an unconscious removal of the third protection element. Thus, a conscious decision to disassemble the protection assembly must be made, since the tools must be used, to do repair or maintenance work on the joint or on components of the protection arrangement.

In an embodiment of the invention, the first holding projections are formed longer, in an area close to the first edge in the circumferential direction of the outer circumference, than in the third circumferential edge portion distanced from the first front edge. This measure achieves, during the lengthening as well as during the compression of the envelope portion of the third protection element, an advantageous force introduction.

The holding projections include laterally spaced first circumferential edge portions extending parallel to each other which are free of grooves and second circumferential edge portions extending from the first edge portions toward each other defining the groove. The second circumferential edge portions, also having the groove, are connected by a third circumferential edge portion, in the form of an arc portion.

The first or second holding portions of the first protection element or the second protection element include, in top plan view, an essentially rectangular basic shape. The circumferential edge areas, extending parallel in the circumferential direction of the outer circumference of the corresponding protection element, are formed shorter than the circumferential edge areas extending parallel to a longitudinal axis formed by the corresponding protection element. The holding portions, for connection to the holding projections in circumferential direction, include through holes separated, respectively, by a holding web.

The first through holes form part of a tab-like first holding portions arranged circumferentially distributed corresponding to the first holding projections. Preferably six of such tab-like first holding portions are provided. Thus, an advantageous assembly is achieved with a well distributed force introduction over the circumference.

For the use in joints, the first protection element is formed with a diameter larger than the second protection element. The third protection element forms, when seen in a radial sectional view, a fold between the first protection element and the second protection element.

The first front edge of the first protection element and the second front edge of the second protection element, in the non-articulated condition of the joint point, are in opposite directions. Preferably, the envelope portion of the third protection element has through holes or a lattice structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments will be described below with reference to the drawings wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
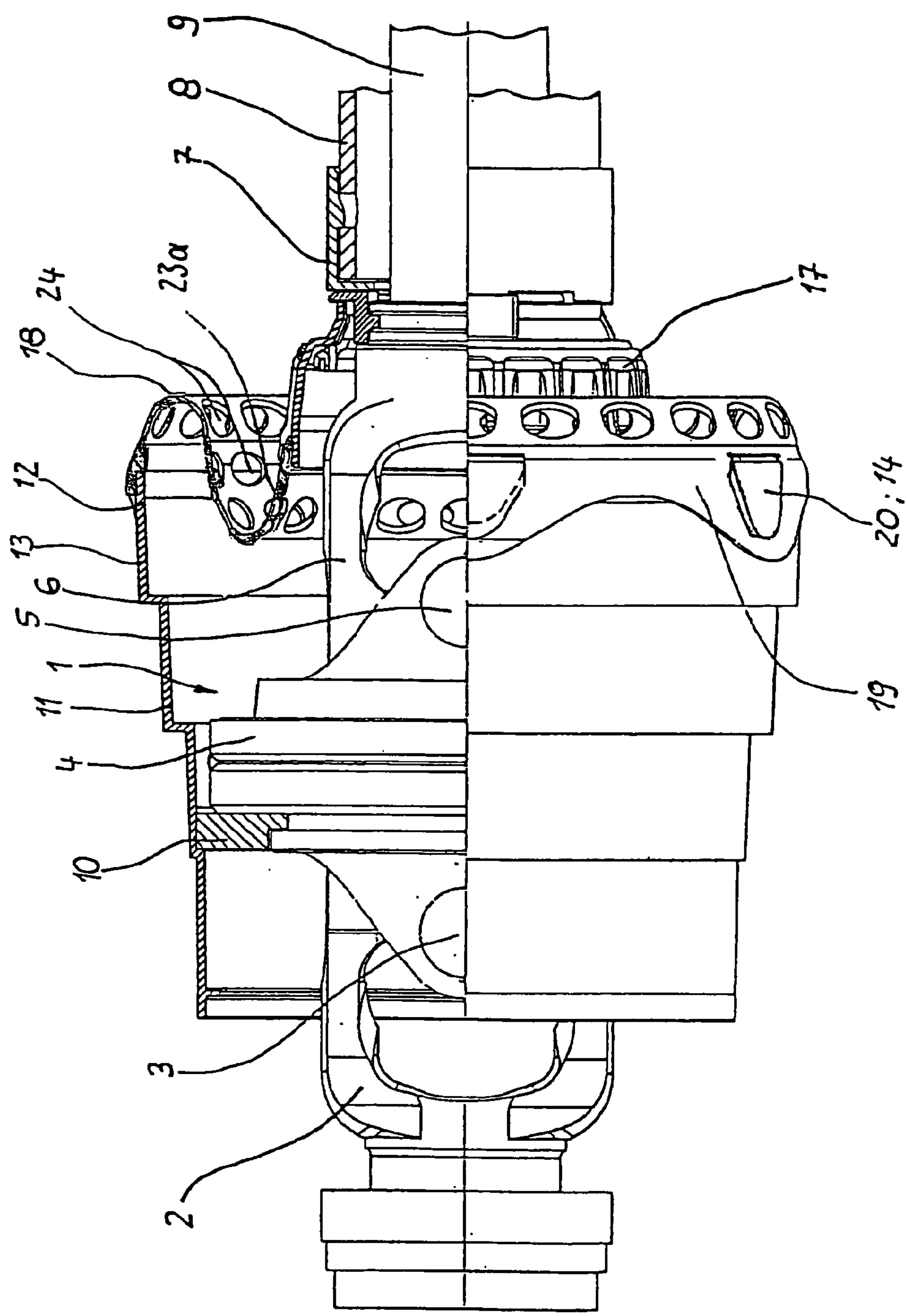
FIG. 1 is half in plan view and half in a longitudinal sectional view of a joint in the form of a double universal joint with a protection arrangement according to the invention.

In FIG. 1, a double universal joint 1 is visible, wherein the protection arrangement is shown in half longitudinal sectional view. The double universal joint 1 has a connection yoke 2 connected, via a first journal cross 3, to the corresponding joint yoke of a housing 4. This supports a further joint yoke, connected via a second journal cross 5 to the joint yoke 6. Joint yoke 6 is connected to a profiled tube 9. The profiled tube 9 is part of a length adjustment arrangement which is telescopically connected, via a further profiled tube (not represented), with the profiled tube 9 and to a further joint arrangement. A connection element 7 is mounted on the joint yoke 6. The connection element 7, which is connected to a protection tube 8, covers the profiled tube 9. A torque is, for example, transmitted via the connection yoke 2, the housing 4 with the two joint yokes and the two journal crosses 3 and 5 onto the joint yoke 6. Then from the joint yoke 6, via the profiled tube, onto a corresponding arrangement at the other end of the universal shaft. In some agricultural devices and self-propelled implements, such joint arrangements are often freely accessible. For example, when they serve for the transmission of the rotational movement from the power take-off shaft of a tractor to an attached implement, protection arrangements are provided. These protection arrangements are stationarily held. The protection arrangements are supported by the joint, but do not rotate with the joint during operation. Accordingly, the protection arrangements are connected, via not represented members, to a stationary part of the implement. The components belonging to the protection arrangement are connected to each other such that they achieve a fast connection, so that all components are stationary.

The protection arrangement according to the invention relates especially to the to be covered portion of a universal shaft in the area of one joint, for example in the form of a double universal joint 1.

The protection arrangement includes a first protection element 11 which is made from a plastic material. The first protection element 11 is rotationally supported by a bearing ring 10 on the housing 4 of the joint 1. An annular portion 12, with its outer circumference 13, extends away from the connection yoke 2. Circumferentially distributed first holding projections 14 are formed on the outer circumference 13. The holding protections 14 are the first attachment mechanism. Their design is described in detail in connection with FIGS. 2 and 3.

A second protection element 15 is provided, which is connected to the connection element 7. Additionally, the second protection element could comprise the function of the connection element. The second protection element 15 includes second holding projections 17 on its outer circumference 16. The design is described in the following with reference to FIGS. 5 and 6.

A third protection element 18 is arranged between the first protection element 11 and the second protection element 15, which has a smaller diameter. The third protection element 18 has a first annular end 19 which is connected to the outer circumference 13 of the first protection element 11. The third protection element 18 has first through holes 20 as the first connection mechanism, circumferentially distributed around the longitudinal axis X and interacting, respectively, with the first holding projections 14. The first through hole design is described in detail in connection with FIG. 4.

The third protection element 18 has a second annular end 21. Second through holes 22 are circumferentially distributed around the longitudinal axis X in the second annular end 21. The second through holes 22 engage with the second holding projections 17. An envelope portion 23 is provided in the area between the first annular end 19 and the second annular end 21. The envelope portion 23 forms, in a radial sectional view, as is shown, a fold 23*a*. Through holes 24 are distributedly arranged in the envelope portion 23. The envelope portion 23 can have, as described in connection with DE 101 53 822 C1 (U.S. 2003/0109316A11, a lattice structure. The through holes 23 form, as a whole, a perforated structure.

The third protection element 18 prevents elements from entering the space formed between the first protection element 11 and the components of the joint 1. This space is necessary for the articulation of the joint 1. The perforated structure with the through holes 24 is correspondingly formed to prevent such an access.

Figures 2, 3, 4:
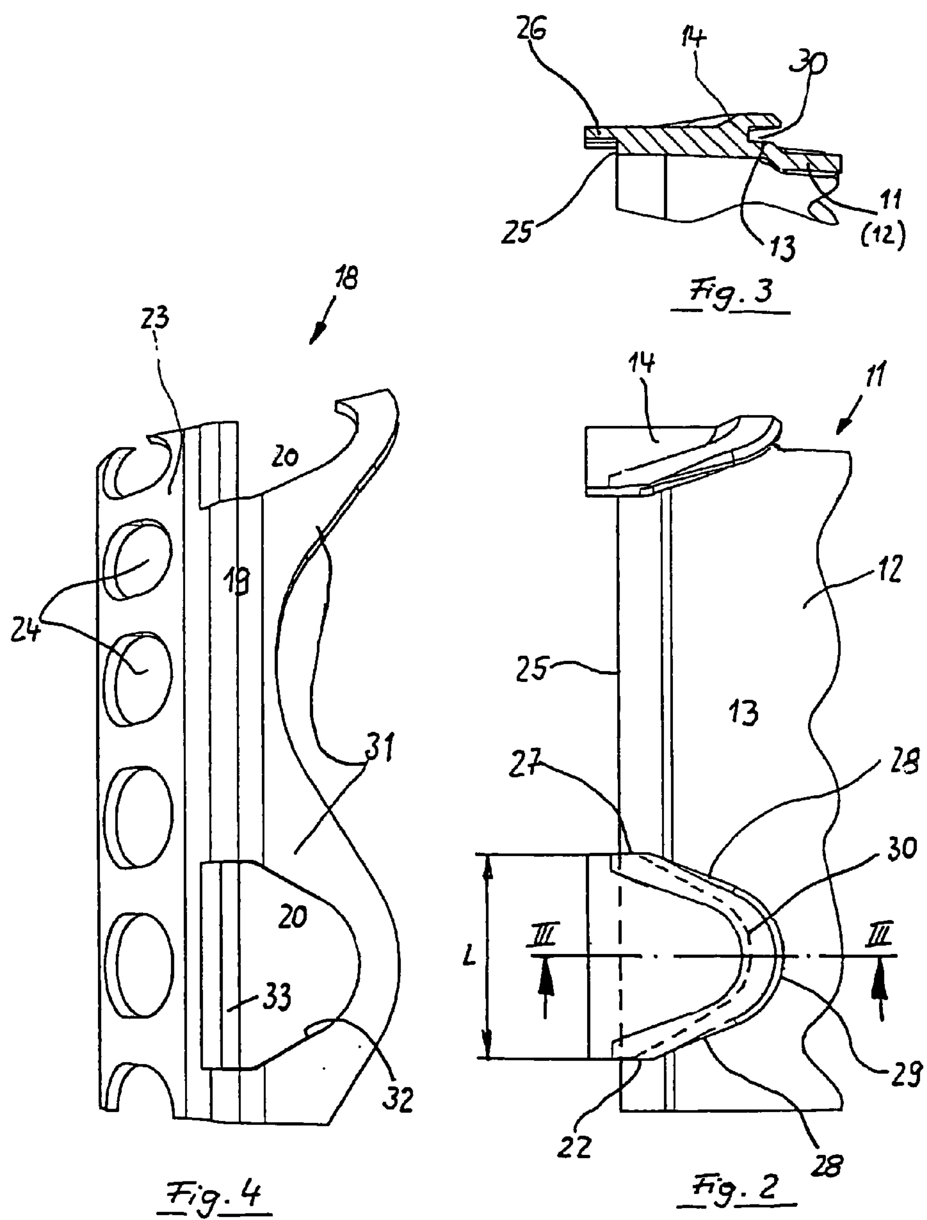
FIG. 2 is a plan view onto a developed view of the annular portion of the first protection element with two first holding projections.
FIG. 3 is a sectional view along line III—III of FIG. 2.
FIG. 4 is a plan view of a circumferential portion of the third protection element in its developed form fitting to the portion of FIG. 2 with two first holding portions having first through holes and fitting to the first holding projections.

The connection between the first protection element 11 and the third protection element 18 is described in detail with reference to FIGS. 2 to 4. FIG. 2 represents a part of a developed view of the annular portion 12. The annular portion 12 of the first protection element 11 ends in a first front edge 25. First holding projections 14 are formed on the outer circumference 13 of this annular portion 12 of the first protection element 11. The first holding projections 14 are circumferentially distributed, project from the outer circumference 13, and are arranged in an area close to the first front edge 25.

The first holding projections 14 comprise, respectively, a support tab 26, projecting beyond the first front edge 25. The supporting tab 26 has a length L in the circumferential direction. Two first circumferential edge portions 27 extend away from the support tabs 26, starting from the first front edge 25. The circumferential edge portions 27 extend at a right angle to the front edge 25 and parallel to each other and extend along the support tabs 26. Second circumferential edge portions 26, respectively, extend from the first circumferential edge portions. The second circumferential edge portions 28 extend towards each other and are connected at their ends, distanced to the support tabs 26, by an arc portion 29. The arc portion 29 forms a third circumferential edge portion. A first groove 30 extends along the second circumferential edge portions 28 and the third circumferential edge portion 29. Preferably, six of such holding projections 14 are provided circumferentially distributed around the first projection element 11. Of these only a portion with two holding projections 14 is shown in the developed view of FIG. 2.

In FIG. 4 the first annular end 19 of the third protection element 18 is shown as a portion in a developed view. The third protection element 18 is made from an elastomer material, such as a thermoplastic material, in order to achieve a sufficient flexibility (elasticity) during the articulation of the joint 1.

The portion shown in FIG. 4 has two holding portions 31. The holding portions 31 are tab-like and project from the first annular end 19. First through holes 20 are provided in the holding portions 31. The first through hole 20 have a shape adapted to the shape of the first holding projections 14. The first through holes 30 are delimited by boundary edge portions 32, 33. Straight portions dimensionally correspond to the distance L of the parallel extending first circumferential edge portions 26 of the first holding projections 14. The two boundary edge portions 32 engage in the groove 30. The boundary edge portion 33 is attached below the support tab 26 and is arranged in the mounted condition between the lower side of the support tab 26 and the front edge 25. Thus, the third protection element 18, with the first holding portions 31, is securely held on the first holding projections 14. The parallel first circumferential edge portions 27 serve to facilitate the assembly of the third protection element 18 when it engages the first holding portions 31 with the first holding projections 14.

Figure 6:
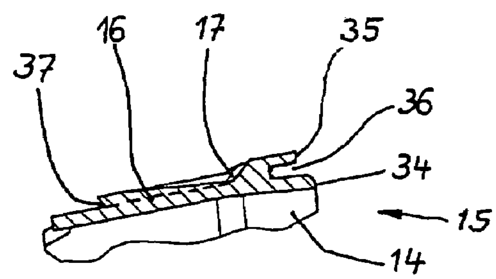
FIG. 6 is a sectional view along line VI—VI of FIG. 5.
Figure 5:
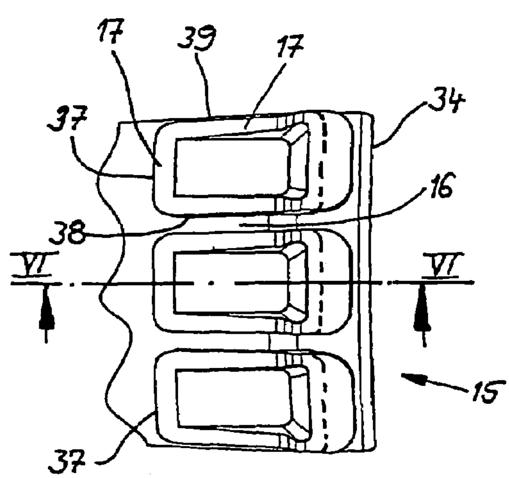
FIG. 5 is a plan view onto a developed view of a portion of the second protection element with two second holding projections.
Figure 7:
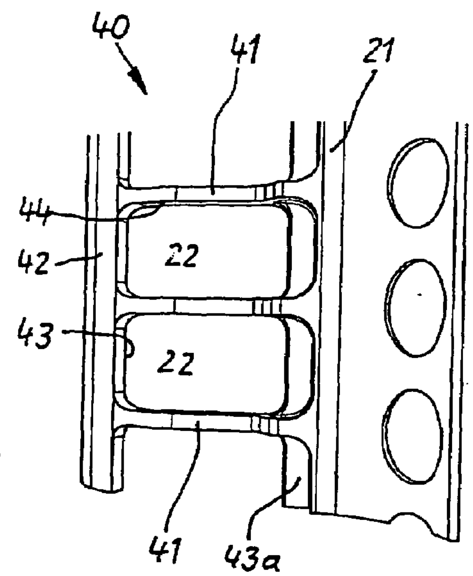
FIG. 7 is a plan view onto a developed view of the second annular end of the third protection element with the second through holes in the second holding portions.

In FIGS. 5 and 6, the second protection element 15 is represented with a portion of its outer circumference 16 as a developed view or a sectional view, respectively. The second protection element 15 is also annular and has the second front edge 34. The second front edge 34, in the assembled condition of the components of the protection arrangement on the joint 1, faces the first front edge 25. This means, that the first front edge 25 and the second front edge 34 in the non-articulated condition of the joint 1 are facing in opposite directions.

A multitude of second holding projections 17 is formed on the outer circumference 16 of the second protection element 15. The second holding projections 17 form a second attachment mechanism and project outward beyond the outer circumference 16. The second holding projections 17 are provided relatively close to each other on the circumference. The second holding projections 17 have a first circumferential edge area 35, which is essentially parallel to the front edge 34, but off-set thereto. Starting therefrom, between the outer circumference 16 and the first circumferential edge area 35, a second groove 36 is arranged open in the direction towards the second front edge 34. A third circumferential edge area 38 and a fourth circumferential edge area 39 follow at a right angle to the first circumferential edge area 35. The third 30 and fourth 39 circumferential edges extend away from the second front edge 34. These are connected by a second circumferential edge area 37. The second circumferential edge area 37 extends approximately parallel to the first circumferential edge area 35 and is distanced to the second front edge 34 and forms an undercut or a groove, respectively.

The corresponding circumferential portion of the second annular end 21 of the third protection element 18 forms second holding portions 41. The second holding portions 41 include a second through hole 22 for each second holding projection 17. The second holding portions 41 include a holding web 41 and circumferential web 42 between each two second through holes 22 arranged next to each other on the circumference. Each second through hole 22 is delimited by parallel boundary edge portions 43, **43*a* and parallel boundary edge portions 44, which are adapted to the corresponding second holding projection 17. The boundary edge portion 43*a* engages in the groove 36 of the corresponding second holding projection 17. The two boundary edge portions 43 extend parallel to each other and are adapted to the inner boundary edge of the second groove 36 or the second circumferential edge portion 37, respectively. The two parallel boundary edge portions 44 interact with the third and fourth circumferential edge area 38, 39**.

The holding webs 41 are accommodated between two second holding projections 17 which are arranged next to each other on the circumference. The circumferential web 42 gets behind the second circumferential edge portion 37 of the holding projections 17. The boundary edge portions **43*a* secure the retainment of the third protection element 18 as well as the boundary edge portion 33 during the moving of the two front edges 25, 34, towards each other. The other areas secure the retainment when tensional forces are produced due to a lengthening of the third protection element 18 in the area of the fold 23*a***.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A protection arrangement for a joint comprising:

a first protection element including an annular portion having a first front edge, at least one first attachment mechanism on an outer circumference of said annular portion;

an annular second protection element having at least one second attachment mechanism on an outer circumference and a second front edge;

a third protection element made from an elastomer material, said third protection element having a first annular end with at least one first connection mechanism for connecting to said at least one first attachment mechanism and on a second annular end at least one second connection mechanism for connecting to said at least one second attachment mechanism and a circumferentially extending envelope portion between said first annular end and said second annular end, said envelope forming at least one fold between said first and second annular ends;

said at least one first attachment mechanism of said first protection element including first holding projections circumferentially distributed on the outer circumference of the first protection element close to the first front edge, said first holding projections project beyond the outer circumference, and a groove form at least over a circumferential portion of said first holding projections distanced from the first front edge and an undercut circumferential edge portion or a support tab formed over a circumferential portion close to the first front edge, said undercut circumferential portion or said support tab projecting beyond the first front edge;

said at least one second attachment mechanism of the second protection element including second holding projections circumferentially distributed on the outer circumference of the second protection element close to the second front edge, said second holding projections projecting beyond the outer circumference and a second groove formed at least over a first circumferential edge area close to the second front edge, an undercut portion or a groove formed over a second circumferential edge area distanced from the second front edge;

the first connection mechanism and the second connection mechanism include holding portions formed on the third protection element at its ends, said holding portions have a number of first through holes and second through holes corresponding to the number of first holding projections and second holding projections, said first through holes and second through holes engage the holding projections and a boundary edge portions of which engage, respectively, at least in the corresponding groove.

2. The protection arrangement according to claim 1, wherein the first holding projections are formed longer in an area close to the first edge in a circumferential direction of the outer circumference than in a third circumferential edge portion distanced from the first front edge.

3. The protection arrangement according to claim 2, wherein the holding projections, in an area close to the first front edge, include at least one laterally spaced first circumferential edge portions extending parallel to each other which are free of grooves, and at least one second circumferential edge portions extending from said first circumferential edge portions towards each other and defining said groove.

4. The protection arrangement according to claim 3, wherein the second circumferential edge portions, extending towards each other, are connected by said third circumferential edge portion, said third circumferential edge portion being an arc portion defining said groove.

5. The protection arrangement according to claim 1, wherein the first or second holding projections of the first protection element or the second protection element include, in top plan view, an essentially rectangular basic shape, and circumferential edge areas extending parallel in the circumferential direction of the outer circumference of the corresponding protection element are formed shorter than the circumferential edge areas extending parallel to a longitudinal axis formed by the corresponding protection element.

6. The protection arrangement according to claim 5, wherein the holding portions for the connection to the holding projections include, in the circumferential direction, through holes separated, respectively, by a holding web.

7. The protection arrangement according to claim 1, wherein first through holes form part of the first holding portions circumferentially distributed corresponding to the first holding projections.

8. The protection arrangement according to claim 1, wherein the first protection element is formed with a diameter larger than the second protection element and the third protection element forms, when seen in a radial section, a fold between the first protection element and the second protection element.

9. The protection arrangement according to claim 1, wherein the first front edge and the second front edge point, in the non-articulated condition of the joint, in opposite directions.

10. The protection arrangement according to claim 1, wherein the envelope portion of the third protection element has through holes or a lattice structure.

* * * * *